(12) United States Patent
Yasuda et al.

(10) Patent No.: US 8,589,011 B2
(45) Date of Patent: *Nov. 19, 2013

(54) ELECTRIC POWER CONTROL SYSTEM, ELECTRIC POWER CONTROL METHOD, AND CONTROL DEVICE, DATA STORAGE MEDIUM, AND SERVER DEVICE FOR THE SAME

(71) Applicant: NEC Corporation, Tokyo (JP)

(72) Inventors: Toru Yasuda, Tokyo (JP); Tetsuo Nishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/766,355

(22) Filed: Feb. 13, 2013

(65) Prior Publication Data

US 2013/0158730 A1 Jun. 20, 2013

Related U.S. Application Data

(63) Continuation of application No. 13/085,663, filed on Apr. 13, 2011, now Pat. No. 8,401,723.

(30) Foreign Application Priority Data

Apr. 27, 2010 (JP) .................................. 2010-101976

(51) Int. Cl.
*B60L 9/00* (2006.01)

(52) U.S. Cl.
USPC .......................................... 701/22; 180/65.21

(58) Field of Classification Search
USPC .................... 701/22; 700/287; 323/266, 282; 180/65.21, 65.31

See application file for complete search history.

(56) References Cited

U.S. PATENT DOCUMENTS

| | | | | |
|---|---|---|---|---|
| 5,574,747 | A * | 11/1996 | Lomp | 375/144 |
| 5,657,257 | A * | 8/1997 | Lee | 713/321 |
| 5,808,881 | A * | 9/1998 | Lee | 363/37 |
| 5,945,820 | A * | 8/1999 | Namgoong et al. | 323/282 |
| 6,819,011 | B2 * | 11/2004 | Kernahan et al. | 307/35 |
| 7,365,661 | B2 * | 4/2008 | Thomas | 341/117 |
| 7,783,872 | B2 * | 8/2010 | Khatri et al. | 713/1 |

* cited by examiner

*Primary Examiner* — Gertrude Arthur Jeanglaude

(57) ABSTRACT

A power control system comprises a power accumulating system including a storage cell charged with electric power supplied from a power generating system and supplying a vehicle with electric power, and a control device controlling a cumulative power amount that is an amount of electric power accumulated in the storage cell. The power control system accepts drive schedule data representing whether or not the vehicle is to be used during a predetermined period. The power control system charges the storage cell till the cumulative power stored in the storage cell reaches a first threshold when the drive schedule data represents the vehicle is to be used during the period, or otherwise, it charges the storage cell till the cumulative power stored in the storage cell reaches a second threshold smaller than the first threshold when the drive schedule data represents the vehicle is not to be used during the period.

13 Claims, 8 Drawing Sheets

ELECTRIC POWER CONTROL SYSTEM, ELECTRIC POWER CONTROL METHOD, AND CONTROL DEVICE, DATA STORAGE MEDIUM, AND SERVER DEVICE FOR THE SAME

CROSS-REFERENCE TO THE RELATED APPLICATIONS

The present invention is Continuation of U.S. patent application Ser. No. 13/085,663, which claims priority from Japanese Patent Application No. 2010-101976 filed on Apr. 27, 2010, the contents of all of which are incorporated herein by reference, in their entirety.

FIELD OF THE INVENTION

The present invention relates to a power control system supplying electric power to power accumulating systems provided with power storage cells.

BACKGROUND ART

A power control system is well known in the art which comprises a power generating system capable of generating electric power, and power accumulating systems provided with storage cells that are adapted to be charged with electric power from the power generating system and to supply a vehicle with electric power for propulsion thereof (see Patent Document 1).

BACKGROUND ART DOCUMENTS

Patent Documents

Patent Document 1: Japanese Patent Preliminary Publication of Unexamined

SUMMARY OF THE INVENTION

Problems to be Solved by the Invention

It is very usual that a driver uses (rides) a vehicle during daytime only. Hence, a storage cell carried within the vehicle is to be charged mostly at night. Thus, there arises a problem that especially when a power control system consists of a relatively large number of power accumulating systems, an amount of electric power supplied from the power generating system to the power accumulating systems over night is prone to be excessive. In order to address this problem, the power control system adapted to accumulate and store a relatively reduced amount of electric power in the storage cells is contemplated, but such a power control system results in the storage cells being charged only insufficiently in cumulative amount of electric power if the vehicles have been in use and consuming energy.

Accordingly, it is an object of the present invention to provide the improved power control system bringing forth a solution to the aforementioned problems in the background art that the storage cell is charged only insufficiently in cumulative power amount while the vehicle has been in use and consuming energy, and that an amount of electric power supplied from the power generating system to the power accumulating systems is excessive.

Means to Solve the Problems

To fulfill the object of the present invention, a power control system in one aspect of the present invention comprises:

a power generating system for generating electric power, a power accumulating system provided with a storage cell that is charged with electric power supplied from the power generating system and supply a vehicle with electric power for propulsion thereof, and a power control device for controlling a cumulative power amount that is an amount of electric power accumulated in the storage cell, a drive schedule acceptance unit for accepting drive schedule data that represents whether or not the vehicle is to be used during a predetermined period in the future, and a cumulative power amount control unit for charging the storage cell with electric power till the cumulative power amount reaches a first threshold if the accepted drive schedule data represents the vehicle is to be used during the period, or otherwise, charging the storage cell with electric power till the cumulative power amount reaches a second threshold lower than the first threshold if the accepted drive schedule data represents the vehicle is not to be used during the period.

In another aspect of the present invention, a power control method is applicable to a power control system that includes:

a power generating system for generating electric power, and a power accumulating system provided with a storage cell that is charged with electric power supplied from the power generating system and supply a vehicle with electric power for propulsion thereof, and a control device for controlling a cumulative power amount that is an amount of electric power accumulated in the storage cell, the power control method comprising:

accepting drive schedule data that represents whether or not the vehicle is to be used during a predetermined period in the future, and charging the storage cell with electric power till the cumulative power amount reaches a first threshold if the accepted drive schedule data represents the vehicle is to be used during the period, or otherwise, charging the storage cell with electric power till the cumulative power amount reaches a second threshold lower than the first threshold if the drive schedule data represents the vehicle is not to be used during the period.

In still another aspect of the present invention, a control device is adapted to control a cumulative power amount that is an amount of electric power accumulated in a storage cell that is charged with electric power supplied from a power generating system and supplies a vehicle with electric power for propulsion thereof, the control device comprising:

a drive schedule acceptance unit for accepting drive schedule data that represents whether or not the vehicle is to be used during a predetermined period in the future, and a cumulative power amount control unit for charging the storage cell with electric power till the cumulative power amount reaches a first threshold if the accepted drive schedule data represents the vehicle is to be used during the period, or otherwise, charging the storage cell with electric power till the cumulative power amount reaches a second threshold lower than the first threshold if the drive schedule data represents the vehicle is not to be used during the period.

In further another aspect of the present invention, a computer-readable data storage medium stores a computer program that comprises at least a set of instructions executable by an information processing device adapted to control a cumulative power amount that is an amount of electric power accumulated in a storage cell that is charged with electric power supplied from an electric power generating system and supplies a vehicle with electric power for propulsion thereof, the instructions including:

accepting drive schedule data that represents whether or not the vehicle is to be used during a predetermined period in the future, and charging the storage cell with electric power till the cumulative power amount reaches a first threshold if the accepted drive schedule data represents the vehicle is to be used during the period, or otherwise, charging the storage cell with electric power till the cumulative power amount reaches a second threshold lower than the first threshold if the drive schedule data represents the vehicle is not to be used during the period.

In further another aspect of the present invention, a server device comprises:

a drive schedule reception unit for receiving drive schedule data that represents whether or not a vehicle is to be used during a predetermined period in the future, the drive schedule data being received from a control device adapted to control a cumulative power amount that is an amount of electric power accumulated in a storage cell, the storage cell being charged with electric power supplied from an electric power generating system which generates electric power and supplying the vehicle with electric power for propulsion thereof, a threshold cumulative power amount control unit for determining a lower limit of the cumulative power amount based on the received drive schedule data, the lower limit being a second threshold smaller than a first threshold that is an upper limit of the cumulative power amount, and a threshold cumulative power amount transmission unit for transmitting the determined second threshold to the control device.

In yet another aspect of the present invention, a computer-readable data storage medium stores a computer program comprising at least a set of instructions executable by an information processing device adapted to control a cumulative power amount that is an amount of electric power accumulated in a storage cell that is charged with electric power supplied from an electric power generating system and supplies a vehicle with electric power for propulsion thereof, the instructions including:

receiving drive schedule data that represents whether or not the vehicle is to be used during a predetermined period in the future, the drive schedule data being received from a control device adapted to control a cumulative power amount that is an amount of electric power accumulated in a storage cell, the storage cell being charged with electric power supplied from an electric power generating system and supplying the vehicle with electric power for propulsion thereof, determining a lower limit of the cumulative power amount based on the received drive schedule data, the lower limit being a second threshold smaller than a first threshold that is an upper limit of the cumulative power amount, and transmitting the value of the determined second threshold to the control device.

A power control system in further another aspect of the present invention comprises:

a power generating system for generating electric power, a power accumulating system provided with a storage cell that is charged with electric power supplied from the power generating system and supply a vehicle with electric power for propulsion thereof, and a power control device for controlling a cumulative power amount that is an amount of electric power accumulated in the storage cell, a drive schedule acceptance means for accepting drive schedule data that represents whether or not the vehicle is to be used during a predetermined period in the future, and a cumulative power amount control means for charging the storage cell with electric power till the cumulative power amount reaches a first threshold if the accepted drive schedule data represents the vehicle is to be used during the period, or otherwise, charging the storage cell with electric power till the cumulative power amount reaches a second threshold lower than the first threshold if the accepted drive schedule data represents the vehicle is not to be used during the period.

In still another aspect of the present invention, a control device is adapted to control a cumulative power amount that is an amount of electric power accumulated in a storage cell that is charged with electric power supplied from a power generating system and supplies a vehicle with electric power for propulsion thereof, the control device comprising:

a drive schedule acceptance means for accepting drive schedule data that represents whether or not the vehicle is to be used during a predetermined period in the future, and a cumulative power amount control means for charging the storage cell with electric power till the cumulative power amount reaches a first threshold if the accepted drive schedule data represents the vehicle is to be used during the period, or otherwise, charging the storage cell with electric power till the cumulative power amount reaches a second threshold lower than the first threshold if the drive schedule data represents the vehicle is not to be used during the period.

In further another aspect of the present invention, a server device comprises:

a drive schedule reception means for receiving drive schedule data that represents whether or not a vehicle is to be used during a predetermined period in the future, the drive schedule data being received from a control device adapted to control a cumulative power amount that is an amount of electric power accumulated in a storage cell, the storage cell being charged with electric power supplied from an electric power generating system which generates electric power and supplying the vehicle with electric power for propulsion thereof, a threshold cumulative power amount control means for determining a lower limit of the cumulative power amount based on the received drive schedule data, the lower limit being a second threshold smaller than a first threshold that is an upper limit of the cumulative power amount, and a threshold cumulative power amount transmission means for transmitting the determined second threshold to the control device.

Effect of the Invention

The present invention, configured in any of the aforementioned manners, is capable of avoiding a shortage of the cumulative power stored in the storage cell while the vehicle has been in use on schedule, and is capable of preventing the electric power generating system from supplying the power accumulating system with an excessive amount of electric power.

EXEMPLARY EMBODIMENT

Exemplary embodiments of a power control system, a power control method, and a control device, a data storage medium, and a server device for the same according to the present invention will now be described in detail, with reference to FIGS. 1 to 9.

Exemplary Embodiment 1

System Architecture

Figure 1:
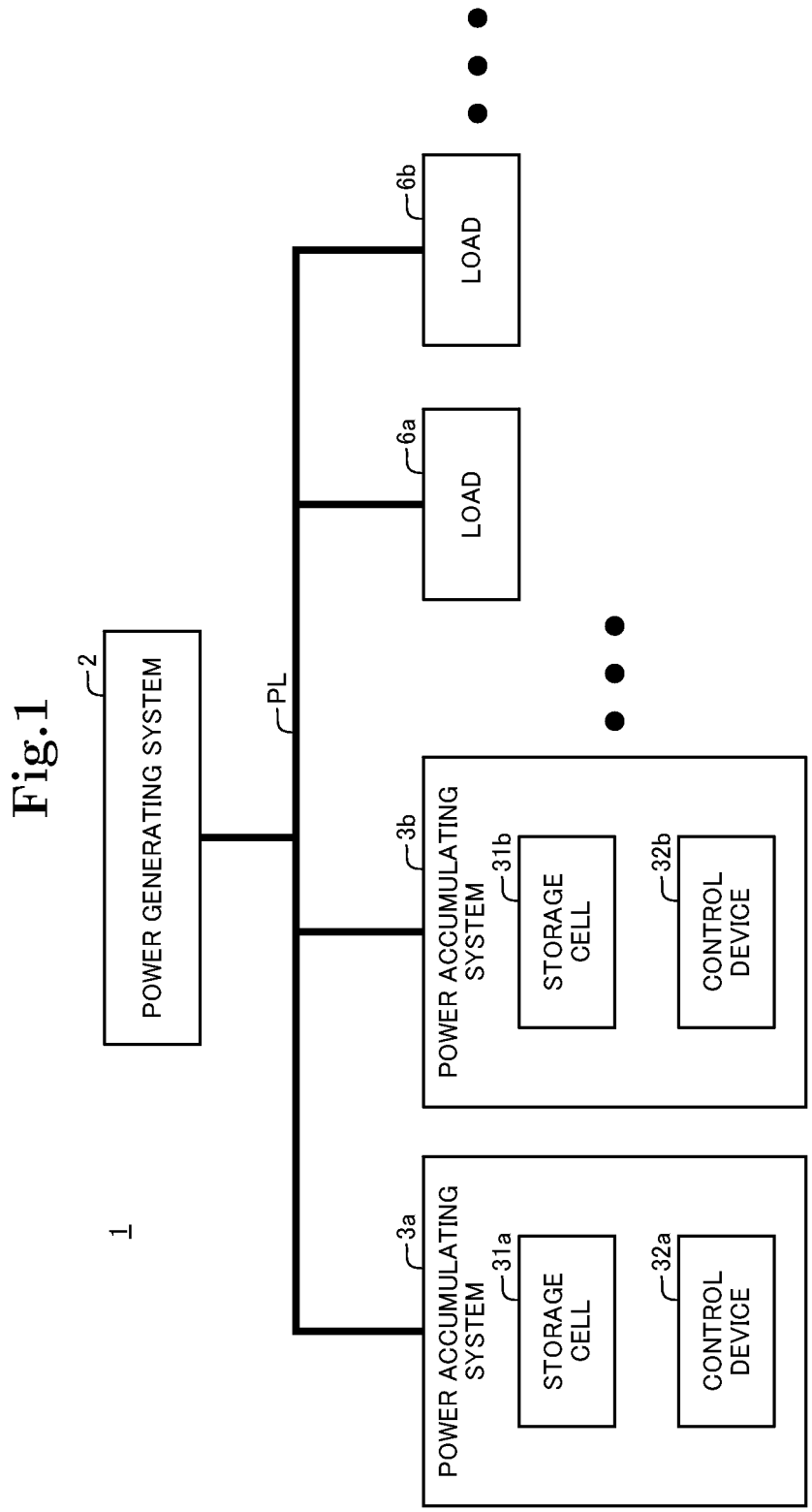
FIG. 1 is a schematic diagram illustrating a part related to power transmission in a first exemplary embodiment of a power control system according to the present invention.

As shown in FIG. 1, a first exemplary embodiment of a power control system 1 is comprised of a power generating system 2, a plurality of power accumulating systems 3a, 3b, and so forth, a plurality of loads 6a, 6b, and so forth. The power generating system 2, the power accumulating systems 3, and the loads 6 are interconnected via wiring PL constituting power distribution network so that the power generating system 2 distributes electric power to each of the power accumulating systems 3 and each of the loads 6.

The power generating system 2 generates electric power. In this embodiment, the power generating system 2 produces electric power through any of thermal power generation, waterpower generation, atomic power generation, and wind power generation. Electricity produced by the power generating system 2 (i.e., the electric power supplied by the power generating system 2) is referred to as system power supply (external energizer).

The power accumulating system 3a includes a storage cell 31a and a control device 32a.

The storage cell 31a is able to be charged with electric power supplied from the power generating system 2. The storage cell 31a supplies a vehicle (not shown) with electric power for propulsion of the vehicle. In this embodiment, the storage cell 31a is carried within the vehicle. The storage cell 31a is also referred to as secondary battery or rechargeable battery (energizer battery).

The control device 32a controls a cumulative power amount that is an amount of electric power accumulated in the storage cell 31a. In this embodiment, the power accumulating system 3a is placed in a residence.

Besides the power accumulating system 3a, the remaining power accumulating systems 3b and the like are similarly configured. Specifically, the power accumulating system 3b includes a storage cell 31b and a control device 32b.

The loads 6 consume electric power supplied by the power generating system 2. For instance, each of the loads 6 may be a device actuated by electric power.

Figure 2:
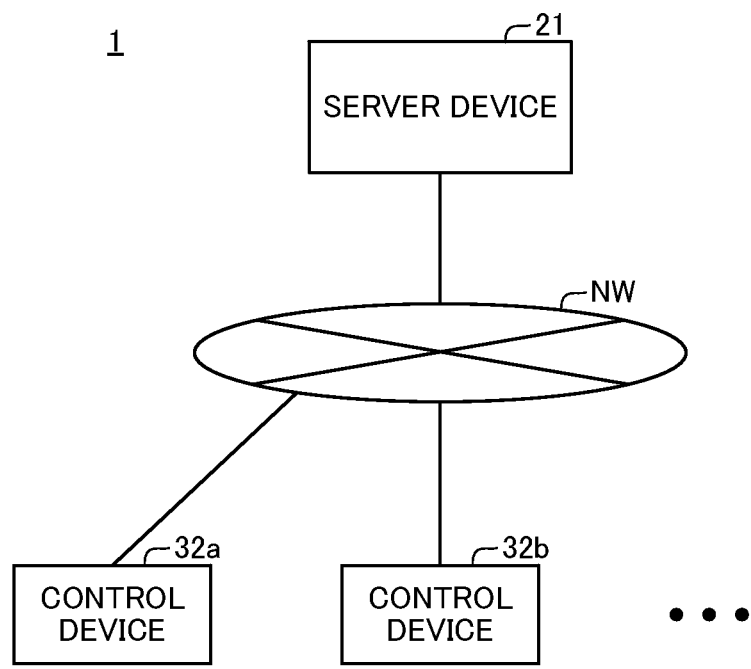
FIG. 2 is a schematic diagram illustrating a part related to data communication in the first exemplary embodiment of the power control system according to the present invention.

In addition, the power control system 1 includes a server device 21, as can be seen in FIG. 2. The server device 21 and the control devices 32 are interconnected via communication lines NW so as to permit data communication among them.

The server device 21 is an information processing device. The server device 21 includes a central processing unit (not shown) and a data storage device (e.g., a memory or a hard disk drive). As a result of CPU's executing a program stored in the data storage device, the server device 21 carries out functions as mentioned below.

Similar to the server device 21, the control devices 32 have their respective CPUs (not shown) and data storage devices. Also similar to the server device 21, each of the control devices 32 performs functions as mentioned below, as a result of CPUs' executing a program stored in its data storage device.

(Functions)

Figure 3:
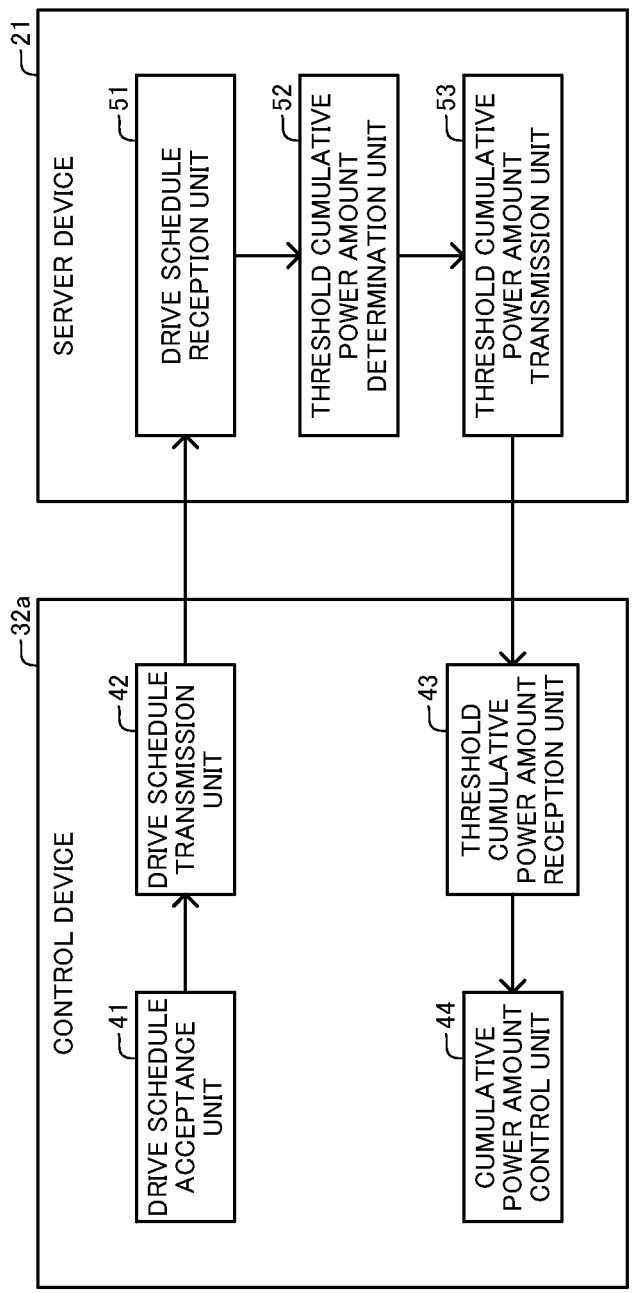
FIG. 3 is a schematic block diagram illustrating functions of the first exemplary embodiment of the power control system according to the present invention.

FIG. 3 is a block diagram illustrating part of a variety of function units of the power control system 1, especially, the function units of the control device 32a and the server device 21, respectively. The remaining control devices 32b and the like carry out the same functions as the control device 32a does.

The control device 32a includes the function units such as a drive schedule acceptance unit (drive schedule acceptance means) 41, a drive schedule transmission unit (drive schedule transmission means) 42, a threshold reception (threshold cumulative power amount reception) unit (threshold reception means) 43, and a cumulative power amount control unit (cumulative power amount control means) 44.

The server device 21 has the function units such as a drive schedule reception unit (drive schedule reception means) 51, a threshold cumulative power amount determination unit (threshold cumulative power amount determination means) 52, and a threshold cumulative power amount transmission unit (threshold cumulative power amount transmission means) 53.

The drive schedule acceptance unit 41 in the control device 32a permits a user to input drive schedule data to accept it. The drive schedule data is information on whether or not a vehicle is to be used during a predetermined period in the future (e.g., from 9 a.m. to 9 p.m. next day, from 5 a.m. to 11 p.m the day after tomorrow, or the like).

In this embodiment, the control device 32a has a button type of switch. When the switch is pressed by the user in confirmation of the predetermined period input by himself or herself, the drive schedule acceptance unit 41 produces the drive schedule data representing that the vehicle is to be used during the predetermined period, and thus, it completes registration of the drive schedule data. Reversely, when the switch is not pressed by the user in confirmation of the predetermined period input by himself or herself, the drive schedule acceptance unit 41 produces the drive schedule data representing the vehicle is not to be used during the predetermined period, and thus, it completes registration of the drive schedule data.

Alternatively the control device 32a may receive the drive schedule data from an information processing device (e.g., a personal computer) intercommunicating therewith to accept the drive schedule data.

The drive schedule data transmission unit 42 in the control device 32a transmits the drive schedule data accepted by the drive schedule acceptance unit 41 to the server device 21.

The drive schedule reception unit 51 in the server device 21 receives the drive schedule data from the control device 32a.

The threshold cumulative power amount determination unit 52 determines a lower (second) threshold of a cumulative amount of supplied electric power, from the drive schedule data received by the drive schedule reception unit 51. The threshold cumulative power amount determination unit 52 determines the second threshold smaller than an upper (first) threshold of the cumulative amount of supplied electric power. Herein, the first threshold refers to an amount of electric power accumulated in the storage cell 31a in the case that the storage cell is fully charged.

More specifically, the threshold cumulative power amount determination unit 52 determines the second threshold at a value that becomes smaller as the number of the control devices 32 transmitting the drive schedule data representing the vehicle is to be used during the period becomes greater.

The greater the number of the vehicles to be used during the period is, the higher the amount of electric power to be supplied from the power generating system 2 to the power accumulating systems 3 becomes. Thus, setting the second threshold at a value that becomes smaller as the number of the vehicles to be used during the predetermined period is increased, an amount of the electric power to be supplied from the power generating system 2 to the power accumulating systems 3 (e.g., the maximum value or the peak value of the power to be supplied) can be prevented from getting excessive.

The threshold cumulative power amount transmission unit 53 in the server device 21 transmits the value of the second threshold determined by the threshold cumulative power amount determination unit 52 to the control device 32a.

The threshold reception unit 43 in the control device 32a receives the value of the second threshold from the server device 21.

When the drive schedule data accepted by the drive schedule acceptance unit 41 represents the vehicle is to be used during the period, the cumulative power amount control unit 44 in the control device 32a charges the storage cell 31a with electric power till the power amount accumulated in the storage cell 31a reaches the first threshold.

On the other hand, when the drive schedule data accepted in the drive schedule acceptance unit 41 represents the vehicle is not to be used during the period, the cumulative power amount control unit 44 charges the storage cell 31a with electric power till the power amount accumulated in the storage cell 31a reaches the second threshold received by the threshold reception unit 43.

(Operation)

Operation of the power control system 1 described so far will now be described.

Figure 4:
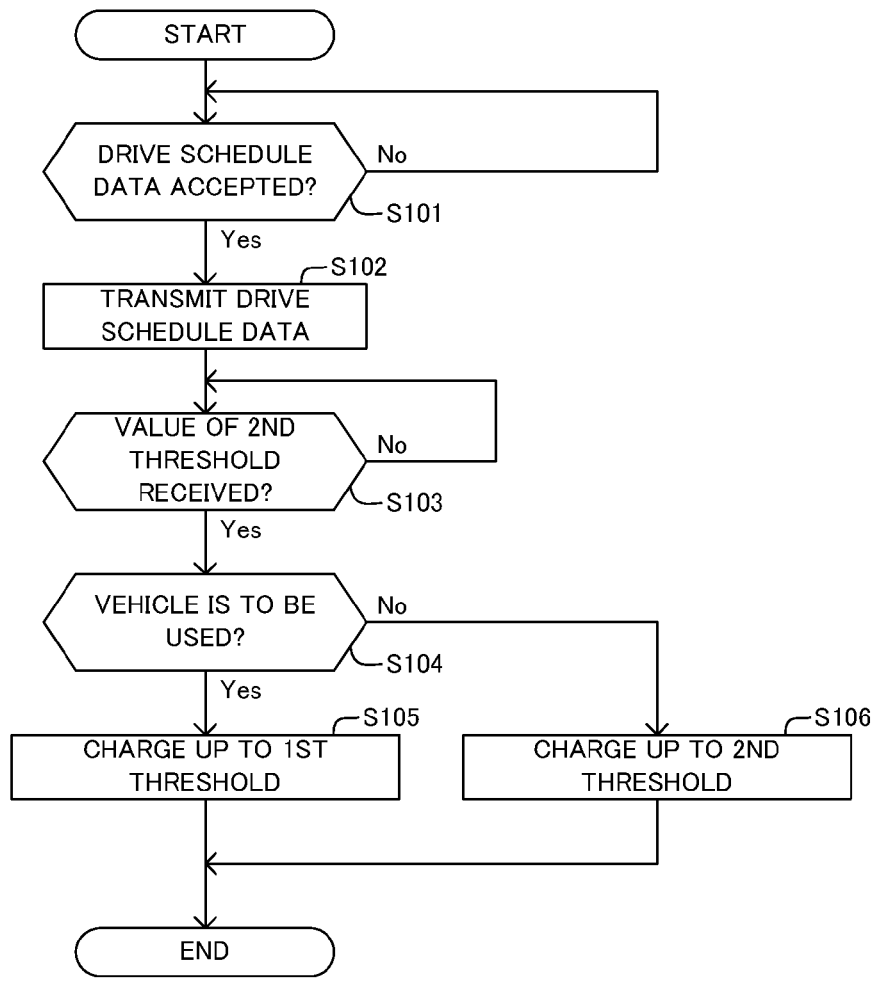
FIG. 4 is a flow chart illustrating a cumulative power amount control program executed by the CPU of a control device in the first exemplary embodiment of the present invention.

Every time the predetermined period input by the user expires, the control device 32a executes a cumulative power amount control program illustrated in the flow chart of FIG. 4.

Specifically, once it starts execution of the cumulative power amount control program, the control device 32a stands by till the drive schedule data is accepted.

Succeeding stages of the operation will be detailed below on the assumption that the drive schedule data representing the vehicle is to be used during the period has been accepted in the control device 32a.

In this case, the control device 32a passes an affirmative judgment 'YES' at Step S101 and goes to Step S102 where it is instructed to transmit the accepted drive schedule data to the server device 21. Then, the control device 32a takes the next step to S103 where it is instructed to stand by till the second threshold is received from the server device 21.

Figure 5:
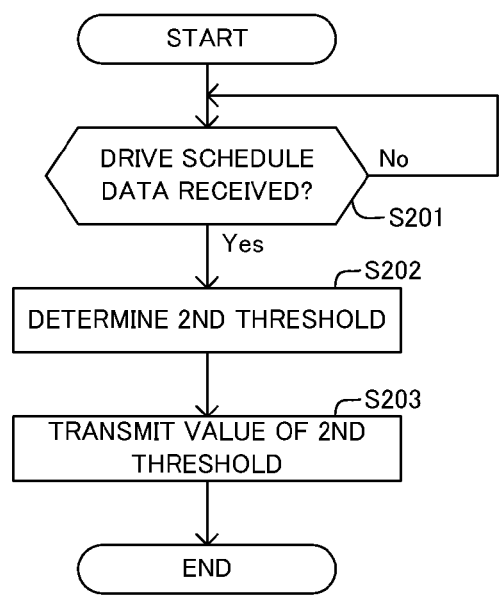
FIG. 5 is a flow chart illustrating a threshold cumulative power amount determination program executable by the CPU of a server device in the first exemplary embodiment of the present invention.

On the other hand, each time a predetermined standby duration elapses after the expiration time of the predetermined period input by the user, the server device 21 executes a threshold cumulative power amount determination program illustrated in the flow chart of FIG. 5.

Specifically, once it starts execution of the threshold cumulative power amount determination program, the server device 21 stands by till the drive schedule data is received from every one of the control devices 32 belonging to the power control system 1 (Step S201).

Upon receiving the drive schedule data from all the control devices 32 in the power control system 1, the server device 21 passes an affirmative judgment 'YES' and goes to Step S202 where it is instructed to determine the second threshold of the cumulative amount of supplied electric power.

In this embodiment, the server device 21 determines the second threshold at a value that becomes smaller as the number of the control devices 32 transmitting the drive schedule data representing the vehicle is to be used during the period becomes greater.

Then, the server device 21 transmits the second threshold thus determined to all the control devices 32 belonging to the power control system 1. In this way, the server 21 terminates the processing by the threshold cumulative power amount determination program.

This permits the control device 32a to receive from the server device 21 the value of the second threshold of the cumulative amount of supplied electric power. Thus, the control device 32a passes an affirmative judgment 'YES' at step S103 to go to the next step S104.

After that, regarding the drive schedule data accepted at step S101, the control device 32a determines whether or not it contains information representing the vehicle is to be used during the period (i.e., if the vehicle is scheduled to be used) (Step S104).

According to the above-mentioned assumption, the accepted drive schedule data contains information representing the vehicle is to be used during the period. Thus, the control device 32a passes an affirmative judgment 'YES' and takes the next step to S105 where it is instructed to charge the storage cell 31a with electric power till the cumulative power amount in the storage cell 31a reaches the first threshold. Eventually, the control device 32a terminates the processing by the cumulative power amount control program.

Next, detailed below will be a case in which the drive schedule data representing the vehicle is not to be used during the period is accepted by the control device 32a.

In this case, the control device 32a passes a negative judgment 'NO' to go to Step S106 where it is instructed to charge the storage cell 31a with electric power till the cumulative power amount stored in the storage cell 31a reaches the second threshold received at Step S103. Thus, the control device 32a terminates the processing by the cumulative power amount control program.

Alternatively, if the drive schedule data representing the vehicle is to be used during the period is accepted, the control device 32a may proceed to Step S104 instead of waiting for reception of the value of the second threshold from the server device 21 (i.e., it may omit execution of the instruction at Step S103).

As has been described, the power control system 1 in the first exemplary embodiment of the present invention can reduce an amount of electric power to be supplied from the power generating system 2 to the power accumulating systems 3 if the vehicles are not to be used during the period, in comparison with the case where the power control system is adapted to charge the storage cell with electric power till the cumulative power amount stored in the storage cell reaches the first threshold.

Moreover, the power control system 1 is adapted to charge the storage cells 31 with electric power till the cumulative power amount stored in the storage cells 31 reaches the first threshold if the vehicle is to be used during the period. Thus, it can be avoided that the storage cells 31 come to be short of power while the vehicle has been in use.

In this way, the power control system 1 is capable of avoiding a shortage of the electric power stored in the storage cells 31 while the vehicle has been in use on schedule, and is capable of preventing the electric power generating system 2 from supplying the power accumulating systems 3 with an excessive amount of electric power.

Furthermore, in the power control system 1 of the first exemplary embodiment, the first threshold is an amount of electric power accumulated in the storage cells 31 to the full extent of their capacities.

In this way, while the vehicle has been in use, a shortage of the electric power stored in the storage cells 31 can be more effectively avoided.

The power control system 1 in the first exemplary embodiment has the control devices 32 that accept the drive schedule data, and alternatively, the server device 21 may accept the drive schedule data. In the latter case, the server device 21 is preferably adapted to transfer the drive schedule data accepted thereby to the control devices 32.

Exemplary Embodiment 2

A second exemplary embodiment of the power control system according to the present invention will now be described. The power control system in the second exemplary embodiment makes a difference from the one in the first exemplary embodiment in that the electric power stored in the storage cells belonging to the power accumulating systems can be supplied to some other loads connected to the power generating system. Thus, such a difference will be a center topic of the following discussion.
(System Architecture)

The power control system 1 in the second exemplary embodiment has a power generating system 2, power accumulating systems 3a, 3b and so forth, and loads 6a, 6b and so forth are interconnected via wiring PL constituting power distribution network so that they mutually transfer electric power to one another.

The power accumulating systems 3a, 3b, and so forth in the second exemplary embodiment are adapted to transfer the electric power stored in the storage cells 31a, 31b, and so forth in the power accumulating systems 3 to the residuary loads 6 connected to the power generating system 2 when the vehicle has not been in use (i.e., the storage cells 31 carried within the vehicle has been connected to the wiring PL).
(Functions)

Figure 6:
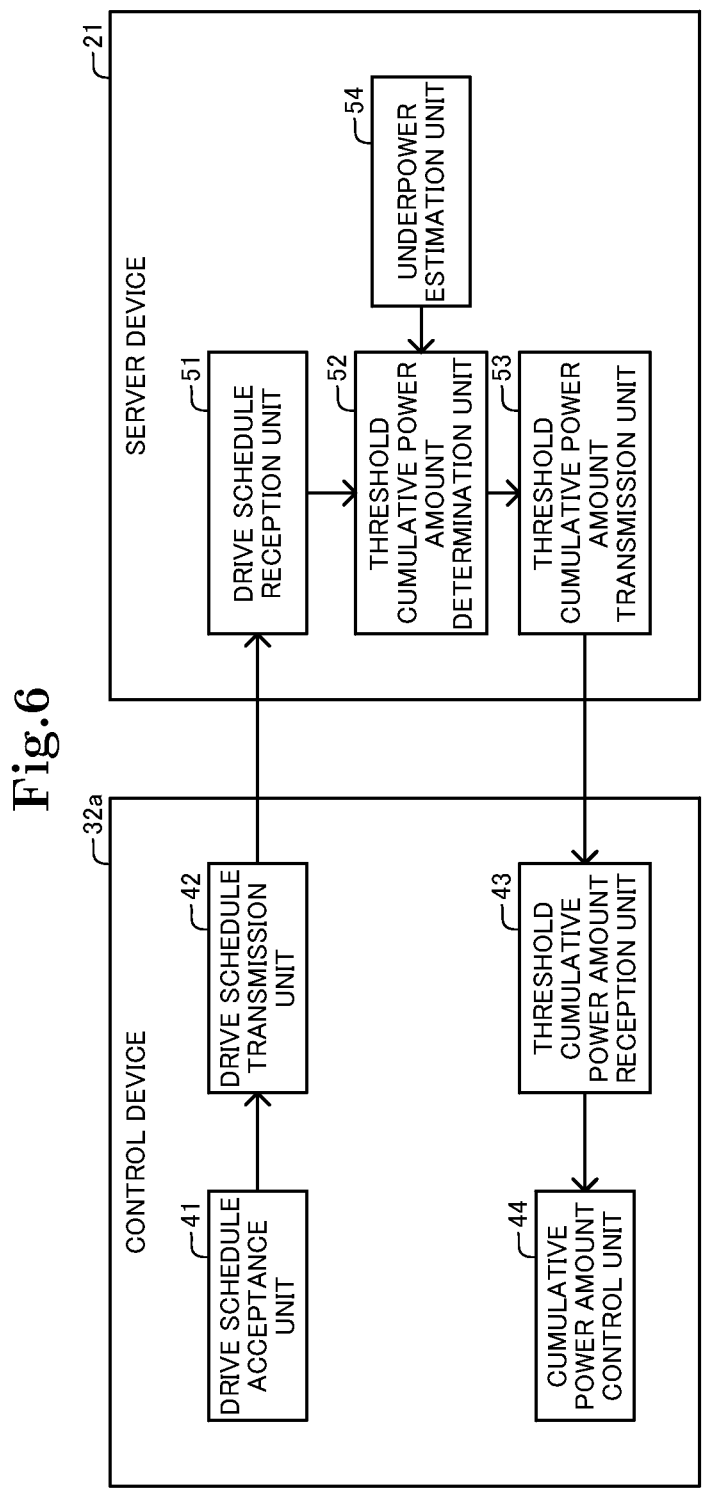
FIG. 6 is a schematic block diagram illustrating functions of a second exemplary embodiment of the power control system according to the present invention.

As shown in FIG. 6, the server device 21 in the second exemplary embodiment functions the same as the one in the first exemplary embodiment and also has an additional functional component of underpower estimation unit (underpower estimation means) 54.

The underpower estimation unit 54 estimates a deficit power amount that is an amount of electric power supplied from the power generating system 2 to predictably be short of during a predetermined period in the future input by a user for which a vehicle is to be used. In this embodiment, the underpower estimation unit 54 estimates the deficit power amount from weather data during the predetermined period, calendar data (e.g., data on what day of the week each day is, on whether or not each day is a holiday, and the like) during the period, power consumption data representing an amount of electric power to predictably be consumed during the period, and operation data represents running conditions of the power generating system 2.

In the power control system 1, electric power to be consumed is recognized as being varied depending upon weather, calendar day and month (e.g., the first to fifth weekdays, holidays, etc.), and the like. An amount of electric power produced by the power generating system 2 is likely to be varied depending upon its running conditions. Thus, configured in the aforementioned manner, the power control system 1 is capable of estimating the deficit power amount with the enhanced accuracy.

The threshold cumulative power amount control unit 52 determines a lower (second) threshold of a cumulative amount of electric power from the deficit power amount estimated by the underpower estimation unit 54 and the drive schedule data received from the drive schedule reception unit 51. Specifically, the threshold cumulative power amount control unit 52 determines the second threshold at a value that becomes higher as the greater figure is given as the estimated deficit power amount and determines it at a value that becomes smaller as the greater number of control devices 32a, 32b, and so forth transmit the drive schedule data representing the vehicle is to be used during the period (as the greater number of vehicles are to be used).

While the vehicle has been used, it is impossible to supply power from the storage cells 31 in the power accumulating systems 3 to the residuary loads 6 connected to the power generating system 2. Thus, configured as mentioned above, the power control system 1 is capable of more assuredly avoiding a shortage of the electric power to be supplied to the loads 6 connected to the power generating system 2.

In this embodiment, the threshold cumulative power amount control unit 52 sets the second threshold of the cumulative power amount at a computation resulted from dividing the estimated deficit power amount by the difference of the number of the vehicles to be used in the future subtracted from the total number of the control devices 32 and further multiplying the resultant quotient by a predetermined factor.

As has been described, the power control system 1 in the second exemplary embodiment of the present invention is capable of diverting the power stored in the storage cells 31 in the power accumulating systems 3 to energize the loads 6 connected to the power generating system 2 (which normally should have been energized by the power generating system 2) in the event of a shortage of the electric power supplied from the power generating system 2. In addition, setting the second threshold sufficient to charge the storage cells 31 with the predicted deficit power amount or even more of electric power, the power control system is capable of avoiding a shortage of the electric power to be supplied to the residuary loads 6 connected to the power generating system 2.

Exemplary Embodiment 3

A third exemplary embodiment of the power control system according to the present invention will now be described. The power control system in the third exemplary embodiment is distinctive from the second exemplary embodiment in that power accumulating systems themselves produce electric power that is able to be supplied to the residuary loads connected to the power generating system. Accordingly, such a difference will be a center topic of the following discussion.
(System Architecture)

Figure 7:
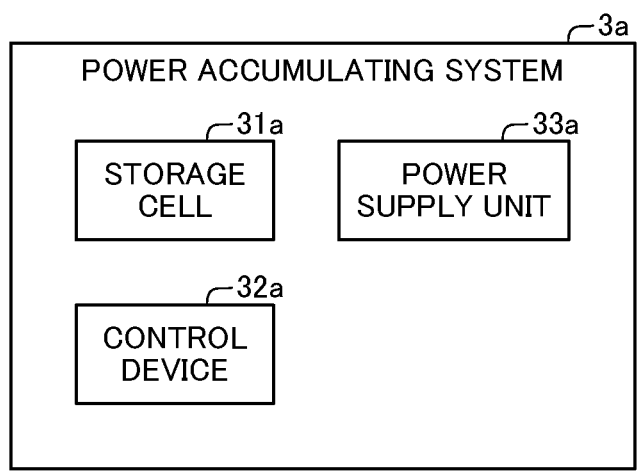
FIG. 7 is a schematic diagram illustrating a power accumulating system in a third exemplary embodiment of the present invention.

As shown in FIG. 7, the power accumulating system 3a in the third exemplary embodiment of the present invention is configured almost the same as its counterpart in the second exemplary embodiment except that it additionally has a power supply unit (power supply means) 33a. The power supply unit 33a itself generates electric power and supplies it to the residuary loads 6a, 6b, and so forth connected to the power generating system 2. In this embodiment, the power supply unit 33a is adapted to generate power through at least one of solar power generation and wind power generation.

Alternatively, the power supply unit 33a may have a secondary battery charged with the electric power thus generated (i.e., additional storage cell besides a storage cell 31a). The power accumulating system 3a may be adapted to charge the storage cell 31a the power generated by the power supply unit 33a.

Besides the power accumulating system 3a, the remaining power accumulating systems 3b and so forth also have their respective power supply units 33b and so forth similar to the power accumulating system 3a.
(Functions)

Figure 8:
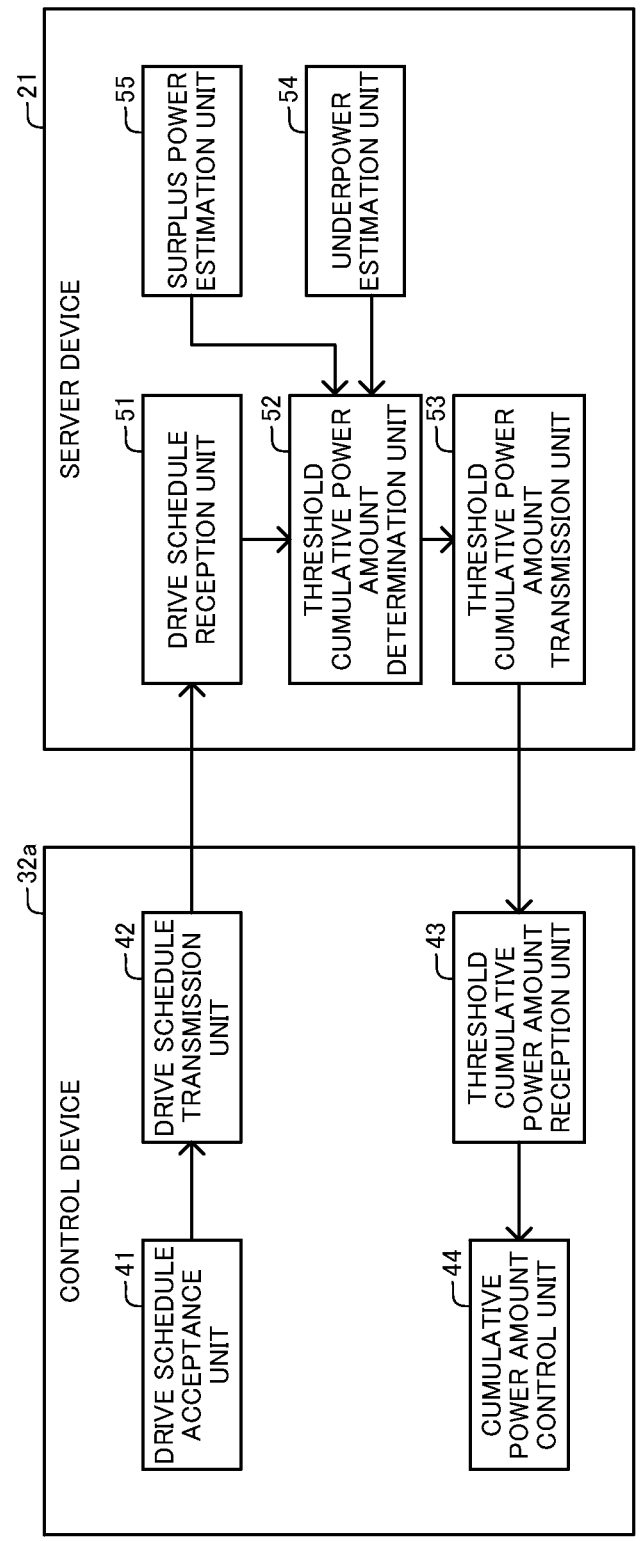
FIG. 8 is a schematic block diagram illustrating functions of the third exemplary embodiment of the power control system according to the present invention.

As shown in FIG. 8, the server device 21 in the third exemplary embodiment includes a surplus power estimation unit (surplus power estimation means) 55 in addition to all the function units in the service device 21 in the second exemplary embodiment.

The surplus power estimation unit 55 estimates a surplus power amount that is an amount of electric power available to supply from the power supply units 33 to the residuary loads 6 connected to the power generating system 2 during a predetermined period in the future input by a user. In this embodiment, the surplus power estimation unit 55 estimates the surplus power amount from weather data representing weather during the period.

The more the weather is unfavorable (the shorter the sunshine duration is), the less an amount of electric power generated through solar power generation becomes. Thus, the shorter the sunshine duration is, the less the surplus power amount becomes. In addition, the weaker the wind blows (i.e., the lower the wind speed is), the less an amount of electric power generated through wind power generation becomes. Thus, the lower the wind speed is, the less the surplus power amount becomes.

Allowing for the above, in this embodiment, the surplus power estimation unit 55 estimates the surplus power amount as a value that becomes smaller as the sunshine duration reported by the weather data is shorter and as the lower wind speed is predicted by the weather data. In this way, the surplus power amount can be estimated with the enhanced accuracy.

The threshold cumulative power amount control unit 52 determines a lower (second) threshold of the cumulative power amount from the surplus power amount estimated by the surplus power estimation unit 55, the deficient power amount estimated by the underpower estimation unit 54, and the drive schedule data received by the drive schedule reception unit 51.

Specifically, the threshold cumulative power amount determination unit 52 determines the second threshold at a value that becomes smaller as the greater figure is given as the estimated surplus power amount and as the greater number of control devices 32a, 32b, and so forth transmit the drive schedule data representing the vehicle is to be used during the period (as the greater number of vehicles are to be used).

In this embodiment, the threshold cumulative power amount determination unit 52 determines the second threshold at a value obtained from an arithmetic operation where a first value is computed by subtracting the number of vehicles to be used in the near future from the total number of the control devices 32 while a second value is computed by subtracting the estimated surplus power amount from the predicted deficit power amount, and the second value thus computed is divided by the first value and then multiplied by a predetermined factor.

As has been described, the power control system 1 in the third exemplary embodiment according to the present invention is capable of diverting the power generated by the power accumulating systems 3 to energize the loads 6 connected to the power generating system 2 (which normally should have been energized by the power generating system 2) in the event of a shortage of the electric power supplied from the power generating system 2. Thus, setting the second threshold based on the deficit power amount and the surplus power amount, the power control system 1 is capable of preventing a shortage of the electric power to be supplied to the residuary loads 6 connected to the power generating system 2 and is simultaneously capable of avoiding the second threshold from being set at an excessively great value.

Exemplary Embodiment 4

Figure 9:
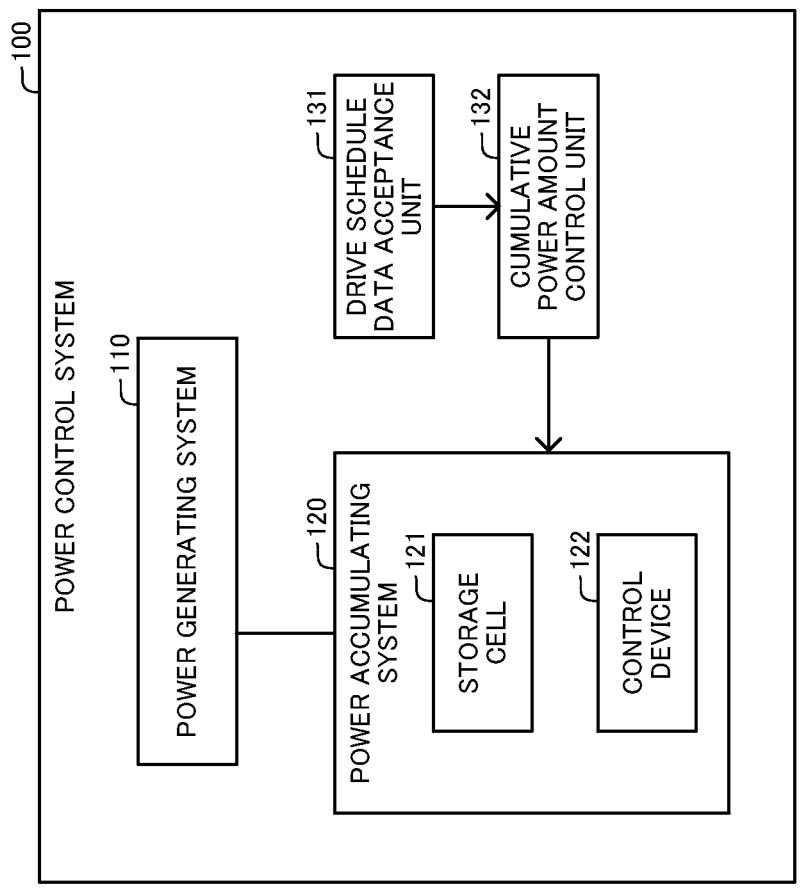
FIG. 9 is a schematic block diagram illustrating functions of a fourth exemplary embodiment of the power control system according to the present invention.

A fourth exemplary embodiment of the power control system according to the present invention will now be described with reference to FIG. 9.

A power control system 100 in the fourth exemplary embodiment comprises:

a power generating system 110 generating electric power, and a power accumulating system 120 that includes a storage cell 121 charged with electric power supplied from the power generating system and supplying a vehicle with electric power for propulsion thereof, and a control device 122 controlling a cumulative power amount that is an amount of electric power accumulated in the storage cell 121.

Furthermore, the power control system 100 comprises:

a drive schedule acceptance unit (drive schedule acceptance means) 131 for accepting drive schedule data that represents whether or not the vehicle is to be used during a predetermined period in the future, and a cumulative power amount control unit (cumulative power amount control means) 132 for charging the storage cell 121 with electric power till the cumulative power stored in the storage cell 121 reaches an upper (first) threshold when the drive schedule data represents the vehicle is to be used during the period, or otherwise, charging the storage cell 121 with electric power till the cumulative power stored in the storage cell 121 reaches a lower (second) threshold smaller than the first threshold when the drive schedule data represents the vehicle is not to be used during the period.

Configured in this manner, the power control system 1 is capable of reducing an amount of the electric power to be supplied from the power generating system 110 to the power accumulating system 120 if the vehicle is not to be used during the predetermined period, in comparison with the power control system that is adapted to charge the storage cell with electric power till it reaches the first threshold of the cumulative power amount.

The storage cell 121 is charged with electric power till it reaches the first threshold when the vehicle is to be used during the period. Thus, it can be avoided that the storage cell 121 comes to be short of power while the vehicle has been in use.

In this way, the power control system 100 is capable of avoiding a shortage of the cumulative power stored in the storage cell 121 while the vehicle has been in use and is capable of preventing the power generating system 110 from supplying an excessive amount of electric power to the power accumulating system 120.

Although the present invention has been described in the context of the exemplary embodiments thereof, the present invention should not be limited to the precise forms of the exemplary embodiments. Various modifications could be made to the architecture and particulars of the present invention by any person having ordinary skills in the art without departing from the true scope of the present invention.

In the aforementioned embodiments, the server device 21 and the control devices 32 have their respective functions implemented by CPU's executing a program (software program), and instead, the functions may be implemented by means of hardware such as circuitry.

Although it is stored in the memory device in the aforementioned embodiments, the program may be stored in a computer readable storage medium. Such a storage medium may be a portable medium, including flexible disks, optical disks, magneto-optic disks, semiconductor memories, and the like.

Other variations of the aforementioned embodiments may be any combination of the embodiments and the modifications thereof.

<Supplementary Notes>

The aforementioned embodiments may be partially or as a whole revised as in the following supplementary notes, but not limited to the description as follows:

(Supplementary Note 1)

A power control system comprising:

a power generating system for generating electric power, a power accumulating system provided with a storage cell that is charged with electric power supplied from the power generating system and supply a vehicle with electric power for propulsion thereof, and a power control device for controlling a cumulative power amount that is an amount of electric power accumulated in the storage cell, a drive schedule acceptance unit for accepting drive schedule data that represents whether or not the vehicle is to be used during a predetermined period in the future, and a cumulative power amount control unit for charging the storage cell with electric power till the cumulative power amount reaches a first threshold if the accepted drive schedule data represents the vehicle is to be used during the period, or otherwise, charging the storage cell with electric power till the cumulative power amount reaches a second threshold lower than the first threshold if the accepted drive schedule data represents the vehicle is not to be used during the period.

Configured in this manner, the power control system can reduce an amount of the electric power to be supplied to the power generating system when the vehicle is not to be used during the period, in comparison with the case where the power control system is adapted to charge the storage cell with electric power till the cumulative power amount stored therein reaches the first threshold.

Moreover, when the vehicle is to be used during the period, the storage cell is charged with electric power till the cumulative power amount stored therein reaches the first threshold. Thus, it can be avoided that the storages cell comes to be short of power while the vehicle has been in use.

In this manner, the power control system is capable of avoiding a shortage of the cumulative power stored in the storage cell while the vehicle has been in use, and is capable of preventing the power generating system from supplying the power accumulating system with an excessive amount of electric power.

(Supplementary Note 2)

The power control system according to Supplementary Note 1, wherein the first threshold is an amount of electric power accumulated in the storage cell in the case that the storage cell is fully charged.

Configured in this manner, the power control system can more assuredly avoid a shortage of the cumulative power stored in the storage cell when the vehicle has been in use.

(Supplementary Note 3)

The power control system according to Supplementary Note 1 or Supplementary Note 2, wherein the power control system comprises a plurality of the power accumulating systems and a server device intercommunicating with each of the control devices of the plurality of the power accumulating systems, each control device including the drive schedule acceptance unit, and a drive schedule transmission unit for transmitting the accepted drive schedule data to the server device, the server device including a drive schedule reception unit for receiving the drive schedule data from the control device, a threshold cumulative power amount determination unit for determining the second threshold based on the received drive schedule data, and a threshold cumulative power amount transmission unit for transmitting a value of the determined second threshold to the control device, the control device including a threshold cumulative power amount reception unit for receiving the value of the second threshold from the server device.

As the number of the vehicles to be used during the period is increased, an amount of the electric power to be supplied from the power generating system to the power accumulating systems becomes greater. Thus, setting the second threshold at a value that becomes smaller as the number of the vehicles to be used during the period is increased, the power generating system can be prevented from supplying the power accumulating systems with an excessive amount of electric power.

(Supplementary Note 4)

The power control system according to Supplementary Note 3, wherein the threshold cumulative power amount determination unit is adapted to set the second threshold at a value that becomes smaller as the number of the control devices transmitting the drive schedule data representing the vehicle is to be used during the period becomes greater.

(Supplementary Note 5)

The power control system according to any of Supplementary Notes 1 to 4, wherein the power accumulating system is adapted to supply the electric power stored in the storage cell to the residuary load connected to the power generating system, wherein the server device includes an underpower estimation unit for estimating a deficit power amount that is an amount of electric power supplied from the power generating system to predictably be short of during the period, and wherein the threshold cumulative power amount determination unit is adapted to determine the second threshold based on the estimated deficit cumulative power amount and the received drive schedule data.

Configured in this manner, the power control system is capable of diverting the power stored in the storage cell in the power accumulating system to energize the residuary load connected to the power generating system (which normally should have been energized by the power generating system) in the event of a shortage of the electric power supplied from the power generating system. Moreover, setting the second threshold sufficient to charge the storage cell with the predicted deficit power amount or even more of electric power, the power control system is capable of avoiding a shortage of the electric power to be supplied to the residuary load connected to the power generating system.

(Supplementary Note 6)

The power control system according to Supplementary Note 5, wherein the threshold cumulative power amount determination unit is adapted to determine the second threshold at a value that becomes greater as the number of the control devices transmitting the drive schedule data representing the vehicle is to be used during the period becomes greater.

While the vehicle has been in use, it is impossible to supply power from the storage cell in the power accumulating system to the residuary load connected to the power generating system. Thus, configured as mentioned above, the power control system is capable of more assuredly avoiding a shortage of the electric power to be supplied to the load connected to the power generating system.

(Supplementary Note 7)

The power control system according to Supplementary Note 5 or Supplementary Note 6, wherein the power accumulating system includes a power supply unit adapted to generate electric power and supply the generated electric power to the residuary load connected to the power generating system, wherein the server device includes a surplus power estimation unit for estimating a surplus power amount that is an amount of electric power available to supply from the power supply unit to the residuary load connected to the power generating system during the period, and wherein the threshold cumulative power amount determination unit is adapted to determine the second threshold based on the estimated deficit cumulative power amount, the estimated surplus power amount, and the received drive schedule data.

Configured in this manner, the power control system is capable of diverting the power generated by the power accumulating system to energize the residuary loads connected to the power generating system (which normally should have been energized by the power generating system) in the event of a shortage of the electric power supplied from the power generating system. Thus, determining the second threshold based on the deficit power amount and the surplus power amount, the power control system is capable of preventing a shortage of the electric power to be supplied to the residuary load connected to the power generating system and is simultaneously capable of avoiding the second threshold from being set at an excessively great value.

(Supplementary Note 8)

The power control system according to any of Supplementary Notes 5 to 7, wherein the power supply unit is adapted to generate electric power through at least one of solar power generation and wind power generation, and wherein the surplus power estimation unit is adapted to estimates the surplus power amount based on weather data representing weather during the period.

Electric power generated through solar power generation or wind power generation is varied depending upon weather. Thus, configured as in the above, the power control system is capable of estimating the surplus power amount with the enhanced accuracy.

(Supplementary Note 9)

The power control system according to any of Supplementary Notes 5 to 8, wherein the underpower estimation unit is adapted to estimate the deficit power amount based on at least one of weather data representing weather during the period, calendar data representing calendar during the period, power consumption data representing an amount of electric power to predictably be consumed during the period by the residuary load connected to the power generating system, and operation data representing running conditions of the power generating system.

Electric power to be consumed is varied depending upon weather, calendar day and month (e.g., the first to fifth weekdays, holidays, etc.), and the like. An amount of electric power produced by the power generating system is varied depending upon its running conditions. Thus, configured in the aforementioned manner, the power control system is capable of estimating the deficit power amount with the enhanced accuracy.

(Supplementary Note 10)

A power control method applicable to a power control system that includes:

a power generating system for generating electric power, and a power accumulating system provided with a storage cell that is charged with electric power supplied from the power generating system and supply a vehicle with electric power for propulsion thereof, and a control device for controlling a cumulative power amount that is an amount of electric power accumulated in the storage cell, the power control method comprising:

accepting drive schedule data that represents whether or not the vehicle is to be used during a predetermined period in the future, and charging the storage cell with electric power till the cumulative power amount reaches a first threshold if the accepted drive schedule data represents the vehicle is to be used during the period, or otherwise, charging the storage cell with electric power till the cumulative power amount reaches a second threshold lower than the first threshold if the drive schedule data represents the vehicle is not to be used during the period.

(Supplementary Note 11)

The power control method according to Supplementary Note 10, wherein the first threshold is the cumulative power amount stored in the storage cell in the case that the storage cell is fully charged.

(Supplementary Note 12)

The power control method according to Supplementary Note 10 or Supplementary Note 11, wherein the power control system comprises a plurality of the power accumulating systems and a server device intercommunicating with the control devices of the power accumulating systems, and the method includes:

accepting, by the control device, the drive schedule data, transmitting, by the control device, the accepted drive schedule data to the server device, receiving, by the server device, the drive schedule data from the control device, determining, by the server device, the second threshold based on the received drive schedule data, transmitting, by the server device, the value of the second threshold thus determined, to the control device, and receiving, by the control device, the value of the second threshold from the server device.

(Supplementary Note 13)

The power control method according to Supplementary Note 12, wherein the second threshold is determined at a value that becomes smaller as the number of the control devices transmitting the drive schedule data representing the vehicle is to be used during the period becomes greater. (Supplementary Note 14)

A control device adapted to control a cumulative power amount that is an amount of electric power accumulated in a storage cell that is charged with electric power supplied from a power generating system and supplies a vehicle with electric power for propulsion thereof, the control device comprising:

a drive schedule acceptance unit for accepting drive schedule data that represents whether or not the vehicle is to be used during a predetermined period in the future, and a cumulative power amount control unit for charging the storage cell with electric power till the cumulative power amount reaches a first threshold if the accepted drive schedule data represents the vehicle is to be used during the period, or otherwise, charging the storage cell with electric power till the cumulative power amount reaches a second threshold lower than the first threshold if the drive schedule data represents the vehicle is not to be used during the period.

(Supplementary Note 15)

The control device according to Supplementary Note 14, wherein the first threshold is an amount of electric power accumulated in the storage cell in the case that the storage cell is fully charged.

(Supplementary Note 16)

The control device according to Supplementary Note 14 or Supplementary Note 15, further comprising:

a drive schedule transmission unit for transmitting the accepted drive schedule to a server device, and a threshold cumulative power amount reception unit for receiving from the server device the value of the second threshold determined based on the drive schedule data.

(Supplementary Note 17)

A computer-readable data storage medium that stores a computer program comprising at least a set of instructions executable by an information processing device adapted to control a cumulative power amount that is an amount of electric power accumulated in a storage cell that is charged with electric power supplied from an electric power generating system and supplies a vehicle with electric power for propulsion thereof, the instructions including:

accepting drive schedule data that represents whether or not the vehicle is to be used during a predetermined period in the future, and charging the storage cell with electric power till the cumulative power amount reaches a first threshold if the accepted drive schedule data represents the vehicle is to be used during the period, or otherwise, charging the storage cell with electric power till the cumulative power amount reaches a second threshold lower than the first threshold if the drive schedule data represents the vehicle is not to be used during the period.

(Supplementary Note 18)

The computer-readable data storage medium according to Supplementary Note 17, wherein the first threshold is an amount of electric power accumulated in the storage cell in the case that the storage cell is fully charged.

(Supplementary Note 19)

The computer-readable data storage medium according to Supplementary Note 17 or Supplementary Note 18, wherein the computer program further comprises the instructions of:

transmitting the accepted drive schedule data to a server device, and receiving the value of the second threshold from the server device the second threshold determined based on the received drive schedule data.

(Supplementary Note 20)

A server device comprising:

a drive schedule reception unit for receiving drive schedule data that represents whether or not a vehicle is to be used during a predetermined period in the future, the drive schedule data being received from a control device adapted to control a cumulative power amount that is an amount of electric power accumulated in a storage cell, the storage cell being charged with electric power supplied from an electric power generating system which generates electric power and supplying the vehicle with electric power for propulsion thereof, a threshold cumulative power amount control unit for determining a lower limit of the cumulative power amount based on the received drive schedule data, the lower limit being a second threshold smaller than a first threshold that is an upper limit of the cumulative power amount, and a threshold cumulative power amount transmission unit for transmitting the determined second threshold to the control device.

(Supplementary Note 21)

The server device according to Supplementary Note 20, wherein the threshold cumulative power amount transmission unit determines the second threshold at a value that becomes smaller as the number of the control devices transmitting the drive schedule data representing the vehicle is to be used during the period becomes greater.

(Supplementary Note 22)

A computer-readable data storage medium that stores a computer program comprising at least a set of instructions executable by an information processing device adapted to control a cumulative power amount that is an amount of electric power accumulated in a storage cell that is charged with electric power supplied from an electric power generating system and supplies a vehicle with electric power for propulsion thereof, the instructions including:

receiving drive schedule data that represents whether or not the vehicle is to be used during a predetermined period in the future, the drive schedule data being received from a control device adapted to control a cumulative power amount that is an amount of electric power accumulated in a storage cell, the storage cell being charged with electric power supplied from an electric power generating system and supplying the vehicle with electric power for propulsion thereof, determining a lower limit of the cumulative power amount based on the received drive schedule data, the lower limit being a second threshold smaller than a first threshold that is an upper limit of the cumulative power amount, and transmitting the value of the determined second threshold to the control device.

(Supplementary Note 23)

The computer-readable data storage medium according to Supplementary Note 22, wherein the instruction of determining a lower limit of the cumulative power amount includes determining the second threshold at a value that becomes smaller as the number of the control devices transmitting the drive schedule data representing the vehicle is to be used during the period becomes greater.

(Supplementary Note 24)

A power control system comprising:

a power generating system for generating electric power, a power accumulating system provided with a storage cell that is charged with electric power supplied from the power generating system and supply a vehicle with electric power for propulsion thereof, and a power control device for controlling a cumulative power amount that is an amount of electric power accumulated in the storage cell, a drive schedule acceptance means for accepting drive schedule data that represents whether or not the vehicle is to be used during a predetermined period in the future, and a cumulative power amount control means for charging the storage cell with electric power till the cumulative power amount reaches a first threshold if the accepted drive schedule data represents the vehicle is to be used during the period, or otherwise, charging the storage cell with electric power till the cumulative power amount reaches a second threshold lower than the first threshold if the accepted drive schedule data represents the vehicle is not to be used during the period.
(Supplementary Note 25)

A control device adapted to control a cumulative power amount that is an amount of electric power accumulated in a storage cell that is charged with electric power supplied from a power generating system and supplies a vehicle with electric power for propulsion thereof, the control device comprising:

a drive schedule acceptance means for accepting drive schedule data that represents whether or not the vehicle is to be used during a predetermined period in the future, and a cumulative power amount control means for charging the storage cell with electric power till the cumulative power amount reaches a first threshold if the accepted drive schedule data represents the vehicle is to be used during the period, or otherwise, charging the storage cell with electric power till the cumulative power amount reaches a second threshold lower than the first threshold if the drive schedule data represents the vehicle is not to be used during the period.
(Supplementary Note 26)

A server device comprising:

a drive schedule reception means for receiving drive schedule data that represents whether or not a vehicle is to be used during a predetermined period in the future, the drive schedule data being received from a control device adapted to control a cumulative power amount that is an amount of electric power accumulated in a storage cell, the storage cell being charged with electric power supplied from an electric power generating system which generates electric power and supplying the vehicle with electric power for propulsion thereof, a threshold cumulative power amount control means for determining a lower limit of the cumulative power amount based on the received drive schedule data, the lower limit being a second threshold smaller than a first threshold that is an upper limit of the cumulative power amount, and a threshold cumulative power amount transmission means for transmitting the determined second threshold to the control device.

APPLICABLE FIELD IN THE INDUSTRY

The present invention is applicable to power control systems that supply electric power to power accumulating systems including storage cells.

The invention claimed is:

1. A power accumulating system comprising:
a power accumulating system provided with a storage cell that is charged with electric power and supply a load with electric power, and a power control device for controlling a cumulative power amount that is an amount of electric power accumulated in the storage cell,
a drive schedule acceptance unit for accepting drive schedule data that represents whether or not the load is to be used during a predetermined period in the future, and a cumulative power amount control unit for charging the storage cell with electric power till the cumulative power amount reaches a first threshold if the accepted drive schedule data represents the load is to be used during the period, or otherwise, charging the storage cell with electric power till the cumulative power amount reaches a second threshold lower than the first threshold if the accepted drive schedule data represents the load is not to be used during the period.

2. The power accumulating system according to claim 1, wherein the control device is interconnected via communication lines so as to permit data communication among them.

3. The power accumulating system according to claim 2, wherein the control device receives the drive schedule data from the server device, or sends the drive schedule data to the server device.

4. The power control system according to claim 1 comprising:
a plurality of the power accumulating systems and a server device intercommunicating with each of the control devices of the plurality of the power accumulating systems,
each control device including the drive schedule acceptance unit, and a drive schedule transmission unit for transmitting the accepted drive schedule data to the server device,
the server device including a drive schedule reception unit for receiving the drive schedule data from the control device, a threshold cumulative power amount determination unit for determining the second threshold based on the received drive schedule data, and a threshold cumulative power amount transmission unit for transmitting a value of the determined second threshold to the control device,
the control device including a threshold cumulative power amount reception unit for receiving the value of the second threshold from the server device.

5. The power control system according to claim 3, wherein the threshold cumulative power amount determination unit is adapted to set the second threshold at a value that becomes smaller as the number of the control devices transmitting the drive schedule data representing the load is to be used during the period becomes greater.

6. The power control system including a power generating system for generating electric power according to claim 4, wherein the power accumulating system is adapted to supply the electric power stored in the storage cell to the residuary load connected to the power generating system,
wherein the server device includes an underpower estimation unit for estimating a deficit power amount that is an amount of electric power supplied from the power generating system to predictably be short of during the period, and
wherein the threshold cumulative power amount determination unit is adapted to determine the second threshold based on the estimated deficit cumulative power amount and the received drive schedule data.

7. The power control system according to claim 6, wherein the threshold cumulative power amount determination unit is adapted to determine the second threshold at a value that becomes greater as the number of the control devices transmitting the drive schedule data representing the load is to be used during the period becomes greater.

8. The power control system according to claim 6, wherein the power accumulating system includes a power supply unit adapted to generate electric power and supply the generated electric power to the residuary load connected to the power generating system, wherein the server device includes a surplus power estimation unit for estimating a surplus power amount that is an amount of electric power available to supply from the power supply unit to the residuary load connected to the power generating system during the period, and wherein the threshold cumulative power amount determination unit is adapted to determine the second threshold based on the estimated deficit cumulative power amount, the estimated surplus power amount, and the received drive schedule data.

9. The power control system according to claim 8, wherein the power supply unit is adapted to generate electric power through at least one of solar power generation and wind power generation, and wherein the surplus power estimation unit is adapted to estimates the surplus power amount based on weather data representing weather during the period.

10. The power control system according to claim 6, wherein the underpower estimation unit is adapted to estimate the deficit power amount based on at least one of weather data representing weather during the period, calendar data representing calendar during the period, power consumption data representing an amount of electric power to predictably be consumed during the period by the residuary load connected to the power generating system, and operation data representing running conditions of the power generating system.

11. A power control method applicable to a power control system that includes:

a power accumulating system provided with a storage cell that is charged with electric power and supply a load with electric power, and a control device for controlling a cumulative power amount that is an amount of electric power accumulated in the storage cell, the power control method comprising:

accepting drive schedule data that represents whether or not the load is to be used during a predetermined period in the future, and charging the storage cell with electric power till the cumulative power amount reaches a first threshold if the accepted drive schedule data represents the load is to be used during the period, or otherwise, charging the storage cell with electric power till the cumulative power amount reaches a second threshold lower than the first threshold if the drive schedule data represents the load is not to be used during the period.

12. A control device adapted to control a cumulative power amount that is an amount of electric power accumulated in a storage cell that is charged with electric power and supplies a load with electric power, the control device comprising:

a drive schedule acceptance unit for accepting drive schedule data that represents whether or not the load is to be used during a predetermined period in the future, and a cumulative power amount control unit for charging the storage cell with electric power till the cumulative power amount reaches a first threshold if the accepted drive schedule data represents the load is to be used during the period, or otherwise, charging the storage cell with electric power till the cumulative power amount reaches a second threshold lower than the first threshold if the drive schedule data represents the load is not to be used during the period.

13. A server device comprising:

a drive schedule reception unit for receiving drive schedule data that represents whether or not a load is to be used during a predetermined period in the future, the drive schedule data being received from a control device adapted to control a cumulative power amount that is an amount of electric power accumulated in a storage cell, the storage cell being charged with electric power and supplying the load with electric power, a threshold cumulative power amount control unit for determining a lower limit of the cumulative power amount based on the received drive schedule data, the lower limit being a second threshold smaller than a first threshold that is an upper limit of the cumulative power amount, and a threshold cumulative power amount transmission unit for transmitting the determined second threshold to the control device.

\* \* \* \* \*